US012651297B2

(12) United States Patent
Bouëtté et al.

(10) Patent No.: US 12,651,297 B2
(45) Date of Patent: \*Jun. 9, 2026

---

(54) SYSTEMS AND METHODS FOR AUTOMATED DATA PROCESSING USING MACHINE LEARNING FOR VEHICLE LOSS DETECTION

(71) Applicant: THE TORONTO-DOMINION BANK, Toronto (CA)

(72) Inventors: Jean-Christophe Bouëtté, Montreal (CA); Jimmy Lévesque, Blainville (CA); Marc Poulin, Saint-Lambert (CA); Satya Krishna Gorti, Toronto (CA); Keyu Long, Toronto (CA); Nicolas Gervais, St-Hubert (CA); Jennifer Bouchard, Montreal (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/006,744

(22) Filed: Dec. 31, 2024

(65) Prior Publication Data

US 2025/0139708 A1 May 1, 2025

Related U.S. Application Data

(63) Continuation of application No. 17/747,819, filed on May 18, 2022, now Pat. No. 12,223,549.

(51) Int. Cl.
*G06Q 40/08* (2012.01)

(52) U.S. Cl.
CPC .............................. *G06Q 40/08222* (2025.08)

(58) Field of Classification Search
CPC .......................... G06Q 40/08; G06Q 40/08222
See application file for complete search history.

(56) References Cited

U.S. PATENT DOCUMENTS 10,657,647 B1 * 5/2020 Chen ........................ G06T 7/254
10,692,050 B2 6/2020 Taliwal et al.
(Continued)

FOREIGN PATENT DOCUMENTS

CA     3124237 A1 * 1/2022 ......... G06F 18/2178
CN     112862702 A 5/2021
(Continued)

OTHER PUBLICATIONS

"Reddy et al., Automatic Vehicle Damage Detection Classification framework using Fast and Mask Deep learning, Sep. 8, 2022, IEEE, entire document" (Year: 2022).*
(Continued)

*Primary Examiner* — Abhishek Vyas
*Assistant Examiner* — Adam Hilmantel

(57) ABSTRACT

A data processing system comprising: inputting a tiled image of a vehicle including four different angle views of the vehicle combined into a single image to a first machine learning model (e.g. CNN), the model trained based on historical image data to predict a first likelihood of total loss vehicle; inputting a multi-fusion of images each into a second set of machine learning models; the multi-fusion of images including a set of separate and distinct images for each of the views input separately into the second set of machine learning models, and extracting features to predict a second likelihood of total loss vehicle; inputting tabular data relating to the vehicle into a third machine learning model to predict a third likelihood of total loss vehicle for the vehicle; and aggregating the first, second and third likelihood of total loss vehicle to determine the overall likelihood of total loss.

21 Claims, 9 Drawing Sheets

(56) References Cited

U.S. PATENT DOCUMENTS

| | | | |
|---|---|---|---|
| 11,836,684 B2 * | 12/2023 | Gulati | G06N 5/04 |
| 2017/0286763 A1 * | 10/2017 | Fukuda | H04N 7/188 |
| 2018/0260793 A1 * | 9/2018 | Li | G06Q 10/20 |
| 2018/0300576 A1 | 10/2018 | Dalyac et al. | |
| 2018/0365772 A1 * | 12/2018 | Thompson | G06N 7/01 |
| 2021/0081698 A1 | 3/2021 | Lindeman et al. | |
| 2021/0358047 A1 | 11/2021 | Hantehzadeh | |
| 2021/0358048 A1 | 11/2021 | Hantehzadeh | |
| 2021/0358105 A1 | 11/2021 | Hantehzadeh | |
| 2023/0067026 A1 * | 3/2023 | Huts | G06V 20/00 |
| 2023/0334438 A1 * | 10/2023 | Horstmann | G06Q 10/1093 |
| 2024/0086734 A1 * | 3/2024 | Singh | G06N 5/022 |

FOREIGN PATENT DOCUMENTS

| | | | | |
|---|---|---|---|---|
| CN | 114493896 A | * | 5/2022 | G06F 18/24 |
| WO | 2021/217852 A1 | | 11/2021 | |

OTHER PUBLICATIONS

"Mallios et al., Vehicle Damage Severity Estimation for Insurance Operations Using In-The-Wild Mobile Images, Jul. 26, 2023, IEEE, entire document" (Year: 2023).*

* cited by examiner

602

| Claim VIN | Vehicle Age | Vehicle Towed | ... | Drivable |
|-----------|-------------|---------------|-----|----------|
| 1234 | 10 | Yes | | No |

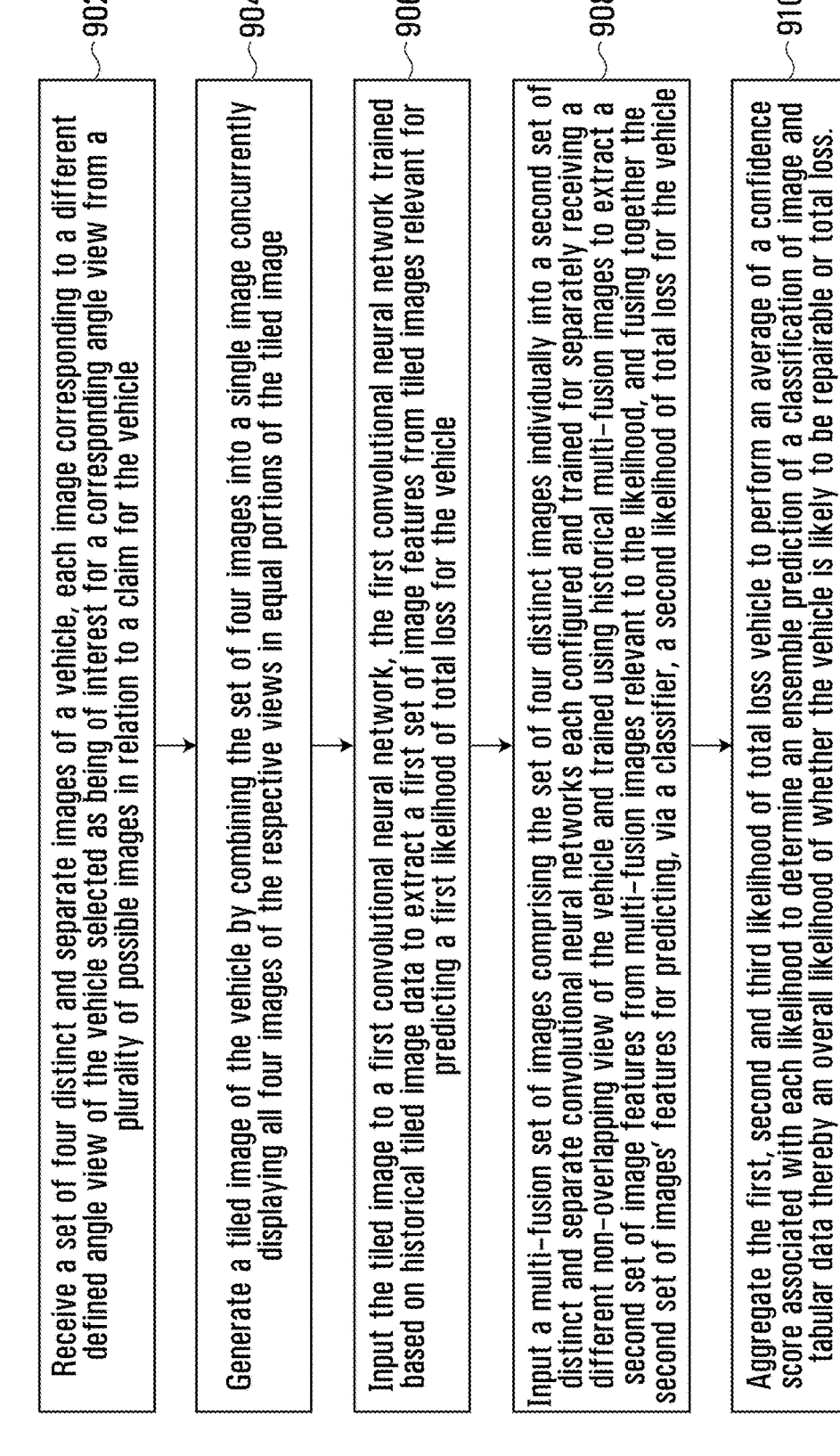

900

Receive a set of four distinct and separate images of a vehicle, each image corresponding to a different defined angle view of the vehicle selected as being of interest for a corresponding angle view from a plurality of possible images in relation to a claim for the vehicle — 902

Generate a tiled image of the vehicle by combining the set of four images into a single image concurrently displaying all four images of the respective views in equal portions of the tiled image — 904

Input the tiled image to a first convolutional neural network, the first convolutional neural network trained based on historical tiled image data to extract a first set of image features from tiled images relevant for predicting a first likelihood of total loss for the vehicle — 906

Input a multi-fusion set of images comprising the set of four distinct images individually into a second set of distinct and separate convolutional neural networks each configured and trained for separately receiving a different non-overlapping view of the vehicle and trained using historical multi-fusion images to extract a second set of image features from multi-fusion images relevant to the likelihood, and fusing together the second set of image features for predicting, via a classifier, a second likelihood of total loss for the vehicle — 908

Aggregate the first, second and third likelihood of total loss vehicle to perform an average of a confidence score associated with each likelihood to determine an ensemble prediction of a classification of image and tabular data thereby an overall likelihood of whether the vehicle is likely to be repairable or total loss. — 910

FIG. 9

SYSTEMS AND METHODS FOR AUTOMATED DATA PROCESSING USING MACHINE LEARNING FOR VEHICLE LOSS DETECTION

CROSS-REFERENCE TO RELATED APPLICATION

This application is a continuation of U.S. patent application Ser. No. 17/747,819, filed May 18, 2022, and entitled "SYSTEMS AND METHODS FOR AUTOMATED DATA PROCESSING USING MACHINE LEARNING FOR VEHICLE LOSS DETECTION", the entire contents of which are incorporated by reference herein.

FIELD

The present disclosure relates to systems and methods for automated data processing using machine learning including neural networks for image processing in vehicle loss detection. In particular, the disclosure relates to processing images, such as vehicle images and associated data using one or more machine learning models to automatically detect features for predicting whether vehicle(s) for which an insurance claim is made are likely repairable or a total loss.

BACKGROUND

Total loss insurance claims and repairable insurance claims are often assessed by different manual means, depending upon the extent of the damage to the vehicle. However, identifying whether vehicles for which insurance is claimed are likely to be repairable vehicles or total loss vehicles (e.g. damaged beyond repair, cost prohibitive to repair) from all of the claim information including various types and formats of documents, images, text, video, etc. including often irrelevant additional information submitted by a claimant is often an inefficient process. Current methods are slow, time consuming, and inaccurate as they utilize manual review and identification of claim information and/ or physical review and assessment of the vehicle in person to assess vehicle damage, and determine whether a particular vehicle for which an insurance claim is made is likely to be a repairable vehicle, or a total loss.

In addition, many vehicle insurance claims for which a determination or repair or total loss must be made are accompanied by various formats of information including images taken by customers which can result in noisy images, or blurry images, or images of other objects or persons, or images visually lacking relevant information or visually undetectable relevant information or irrelevant views of the vehicle. For example, the images may include various angles, with varying levels of noise, quality, and additional unnecessary data or objects or backgrounds which complicates understanding of the images. Manual claims category assessors must view and filter through these large sets of data and images to make a decision on whether or not a total loss exists.

SUMMARY

There is a need for an improved method and system to automatically process and analyse vehicle images and associated data, in order to assess damage on vehicle(s) for which an insurance claim is made and predict the likelihood of vehicle repair or vehicle loss.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer system for automated prediction of a likelihood of a repairable vehicle or a total loss vehicle from vehicle information, the computer system may include: a processor configured to execute instructions; a non-transient computer-readable medium may include instructions that when executed by a processor cause the processor to: obtain a set of four distinct images of a vehicle in relation to a claim for the vehicle being damaged, each image selected from a plurality of possible images and corresponding to a different angle view of the vehicle selected as being of interest, thereby in combination an overall view of the vehicle; generate a tiled image of the vehicle by combining and merging the set of four distinct images into a single image concurrently displaying all images of respective said different angle views in equal portions of the tiled image; process, via a first convolutional neural network the tiled image, the first convolutional neural network configured for image processing and trained based on historical tiled image data to extract a first set of image features from tiled images relevant for predicting a first likelihood of total loss for the vehicle; process, via a second set of distinct and separate convolutional neural networks, a multi-fusion set of images may include the set of four distinct images provided individually to respective ones of the second set of convolutional neural networks each associated with one of the different angle views, each of the second set of convolutional neural networks trained for a different non-overlapping view of the vehicle, using historical multi-fusion images, to extract a second set of image features from multi-fusion images relevant to the likelihood; fuse together the second set of images features to predict, via a classifier, trained based on historical image features of vehicles, a second likelihood of total loss for the vehicle; obtain and process tabular data relating to the vehicle and the likelihood into a machine learning model, the machine learning model trained based on historical tabular data and associated features to predict a third likelihood of total loss for the vehicle; aggregate, via an ensembler, the first, the second and the third likelihood of total loss vehicle to perform an ensemble prediction of a classification of image and tabular data thereby an overall likelihood of whether the vehicle is likely to be repairable or total loss; and present the overall likelihood on a display for the computer system to process the claim.

Other embodiments of this aspect include corresponding computer systems, apparatus, and computer programs recorded on one or more computer storage devices, each configured to perform the actions of the methods.

Implementations may include one or more of the following features.

The instructions further cause the processor to: receive the plurality of possible images of the vehicle, determine, via an object detection machine learning model, within each possible image a location of the vehicle and define a bounding box surrounding the location; automatically crop each said possible image to display only the vehicle; and rotate each said possible image to a defined orientation for subsequent processing thereof.

In some implementations, each different angle view corresponds to one of four predefined angle views for the vehicle.

In some implementations, each said possible image, having been processed by cropping and rotation, is further applied to an image recognition machine learning model for detecting a degree of confidence between the possible image and each of the four predefined angle views, the image recognition machine learning model having been trained on historical images tagged with each of the four predefined angle views.

In some implementations, the instructions further cause the processor to: select a particular image from the possible images as being of interest for a particular angle view as part of the set of four distinct images based on a highest confidence score as compared to other ones of the plurality of possible images for the particular angle view from the image recognition machine learning model.

In some implementations, instructions further cause the processor to: receive an input of historical vehicle image angle data defining an angle for each historical image associated with historical vehicle insurance claims at the image recognition machine learning model for training thereon; receive an input of claim vehicle image angle data may include the set of four distinct images and associated with one or more vehicles for which insurance is claimed; apply at the image recognition machine learning model, the historical vehicle image angle data and the claim vehicle image angle data to identify an angle of one or more vehicles within the claim vehicle image angle data; and select and group one or more representative images which provide views of a substantial portion of all angles of one or more possible vehicles from the claim vehicle image angle data to provide the set of four distinct images as being of interest.

In some implementations, the instructions further cause the processor to: receive an input of historical vehicle image data associated with historical vehicle insurance claims may include an identification of vehicle portions within historical images and identification of non-vehicle related image portions within the historical images and applying to the object detection machine learning model having been trained using the historical vehicle image data; receive the possible images of the vehicle defining an input of claim vehicle image data associated with one or more vehicles for which insurance is claimed; and process the claim vehicle image data, via the object detection machine learning model to remove noise, identify and isolate one or more vehicles within the possible images for use in selecting the set of four distinct images as being of interest.

In some implementations, fusing together the second set of images features further may include the processor being configured to apply the second set of convolutional neural networks to extract a respective image feature set for each of the set of four distinct images and concatenate the respective image feature set for all said four distinct images to generate a combined representation of the features for all of the images to apply the combined representation to the classifier, trained on classifying images corresponding to the different angle views to determine the second likelihood of total loss.

In some implementations, the machine learning model is an XGBoost model trained separately from each of the convolutional neural networks and each of the XGBoost and the convolutional neural networks trained for processing different modalities of data selected from: text and image but related to a particular claim for the vehicle concurrently.

In some implementations, at least one of image of the set of four distinct images depicts damaged portions of the vehicle for subsequent determination of the overall likelihood. Implementations of the described techniques may include hardware, a method or process, or computer software on a computer-accessible medium.

One general aspect includes a computer implemented method of automatically predicting a likelihood of whether vehicle image and text information for a vehicle indicates a repairable vehicle or a total loss vehicle using machine learning, the method may include: receiving a set of four distinct images of a vehicle, each image corresponding to a different defined angle view of the vehicle selected as being of interest for a corresponding angle view from a plurality of possible images in relation to a claim for the vehicle; generating a tiled image of the vehicle by combining the set of four distinct images into a single image concurrently displaying all four images of respective angle views in equal portions of the tiled image; inputting the tiled image to a first convolutional neural network, the first convolutional neural network trained based on historical tiled image data to extract a first set of image features from tiled images relevant for predicting a first likelihood of total loss for the vehicle; inputting a multi-fusion set of images may include the set of four distinct images individually into a second set of distinct and separate convolutional neural networks each configured and trained for separately receiving a different non-overlapping view of the vehicle and trained using historical multi-fusion images to extract a second set of image features from multi-fusion images relevant to the likelihood, and fusing together the second set of images features for predicting, via a classifier, a second likelihood of total loss for the vehicle; receiving and inputting tabular data relating to the vehicle and the likelihood into a machine learning model, the machine learning model trained based on historical tabular data and associated features to predict a third likelihood of total loss for the vehicle; and aggregating the first, second and third likelihood of total loss vehicle to perform an average of a confidence score associated with each likelihood to determine an ensemble prediction of a classification of image and tabular data thereby an overall likelihood of whether the vehicle is likely to be repairable or total loss. Other embodiments of this aspect include corresponding computer systems, apparatus, and computer programs recorded on one or more computer storage devices, each configured to perform the actions of the methods.

Implementations may include one or more of the following features. In some implementations, receiving the set of four distinct images of a vehicle further may include, receiving the plurality of possible images of the vehicle, determining within each image a location of the vehicle within the image and defining a bounding box surrounding the location; and automatically cropping each said image to display only the vehicle.

In some implementations, the method may include: receiving an input of historical vehicle image data associated with historical vehicle insurance claims may include an identification of vehicle portions within historical images and identification of non-vehicle related image portions within the historical images and applying to an object detection machine learning model having been trained using the historical vehicle image data; receiving the set of images of the vehicle defining an input of claim vehicle image data associated with one or more vehicles for which insurance is claimed; and processing the claim vehicle image data to remove noise, identify and isolate one or more vehicles within the set of four distinct images.

In some implementations, each said image selected as being of interest for a corresponding angle view from a plurality of possible images, is selected by applying the plurality of possible images to another machine learning model trained with a set of tagged images and corresponding angle views, thereby generating a confidence score for each said image in relation to each said different defined angle view of the vehicle and selecting a particular image for a particular angle view based on a highest confidence score for the particular angle view from the another machine learning model.

In some implementations, fusing together the second set of images features further may include, applying the second set of convolutional neural networks to extract a respective image feature set for each of the set of four distinct images and concatenating the respective image feature set for all said four images to generate a combined representation of the features for all of the images for applying the combined representation to a respective classifier to determine the second likelihood of total loss.

In some implementations, the method may include receiving an input of historical vehicle image angle data defining an angle for each historical image associated with historical vehicle insurance claims at another machine learning model for training thereon; receiving an input of claim vehicle image angle data may include the set of four distinct images and associated with one or more vehicles for which insurance is claimed; applying at the another machine learning model, the historical vehicle image angle data and the claim vehicle image angle data to identify the angle of one or more vehicles within the claim vehicle image angle data; selecting and grouping one or more representative images which provide views of a substantial portion of all angles of one or more possible vehicles from the claim vehicle image angle data.

In some implementations, the machine learning model is an XGBoost model trained separately from each of the convolutional neural networks and each of the XGBoost and the convolutional neural networks trained for processing different modalities of data selected from: text and image but related to a particular claim concurrently.

In some implementations, the method may include receiving the set of four distinct images further may include at least one of the four distinct images depicting damaged portions of the vehicle for subsequent determination of the overall likelihood. Implementations of the described techniques may include hardware, a method or process, or computer software on a computer-accessible medium.

One general aspect includes a computing device for automatically predicting a likelihood of whether vehicle image and text information for a vehicle indicates a repairable vehicle or a total loss vehicle using machine learning, the computing device may include: a processor, a storage device and a communication device, where each of the storage device and the communication device is coupled to the processor, the storage device storing instructions, which when executed by the processor, configure the computing device to: receive a set of four distinct images of a vehicle, each image corresponding to a different defined angle view of the vehicle selected as being of interest for a corresponding angle view from a plurality of possible images in relation to a claim for the vehicle; generate a tiled image of the vehicle by combining the set of four distinct images into a single image concurrently displaying all four images of respective angle views in equal portions of the tiled image;

input the tiled image to a first convolutional neural network, the first convolutional neural network trained based on historical tiled image data to extract a first set of image features from tiled images relevant for predicting a first likelihood of total loss for the vehicle; input a multi-fusion set of images may include the set of four distinct images individually into a second set of distinct and separate convolutional neural networks each configured and trained for separately receiving a different non-overlapping view of the vehicle and trained using historical multi-fusion images to extract a second set of image features from multi-fusion images relevant to the likelihood, and fusing together the second set of images features for predicting, via a classifier, a second likelihood of total loss for the vehicle; receive and inputting tabular data relating to the vehicle and the likelihood into a machine learning model, the machine learning model trained based on historical tabular data and associated features to predict a third likelihood of total loss for the vehicle; and aggregate the first, second and third likelihood of total loss vehicle to perform an average of a confidence score associated with each likelihood to determine an ensemble prediction of a classification of image and tabular data thereby an overall likelihood of whether the vehicle is likely to be repairable or total loss. Other embodiments of this aspect include corresponding computer systems, apparatus, and computer programs recorded on one or more computer storage devices, each configured to perform the actions of the methods.

Implementations may include one or more of the following features. In some implementations, the instructions further configure the computing device to: receive the plurality of possible images of the vehicle, determine within each image a location of the vehicle within the image and define a bounding box surrounding the location; and automatically cropping each said image to display only the vehicle.

In some implementations, each said image selected as being of interest for a corresponding angle view from a plurality of possible images, is selected by applying the plurality of possible images to another machine learning model trained with a set of tagged images and corresponding angle views, thereby generating a confidence score for each said image in relation to each said different defined angle view of the vehicle and selecting a particular image for a particular angle view based on a highest confidence score for the particular angle view from the another machine learning model.

In some implementations, fusing together the second set of images features further may include, applying the second set of convolutional neural networks to extract a respective image feature set for each of the four distinct images and concatenating the respective image feature set for all said four images to generate a combined representation of the features for all of the images for applying the combined representation to a respective classifier to determine the second likelihood of total loss. Implementations of the described techniques may include hardware, a method or process, or computer software on a computer-accessible medium.

One general aspect includes a non-transitory computer-readable medium containing computer program code that are executable by a processor for the processor to perform the steps of: receiving a set of four distinct images of a vehicle, each image corresponding to a different defined angle view of the vehicle selected as being of interest for a corresponding angle view from a plurality of possible images in relation to a claim for the vehicle; generating a tiled image of the vehicle by combining the set of four distinct images into a single image concurrently displaying all four images of respective angle views in equal portions of the tiled image; inputting the tiled image to a first convolutional neural network, the first convolutional neural network trained based on historical tiled image data to extract a first set of image features from tiled images relevant for predicting a first likelihood of total loss for the vehicle; inputting a multi-fusion set of images may include the set of four distinct images individually into a second set of distinct and separate convolutional neural networks each configured and trained for separately receiving a different non-overlapping view of the vehicle and trained using historical multi-fusion images to extract a second set of image features from multi-fusion images relevant to the likelihood, and fusing together the second set of images features for predicting, via a classifier, a second likelihood of total loss for the vehicle; receiving and inputting tabular data relating to the vehicle and the likelihood into a machine learning model, the machine learning model trained based on historical tabular data and associated features to predict a third likelihood of total loss for the vehicle; and aggregating the first, second and third likelihood of total loss vehicle to perform an average of a confidence score associated with each likelihood to determine an ensemble prediction of a classification of image and tabular data thereby an overall likelihood of whether the vehicle is likely to be repairable or total loss. Other embodiments of this aspect include corresponding computer systems, apparatus, and computer programs recorded on one or more computer storage devices, each configured to perform the actions of the methods.

BRIEF DESCRIPTION OF THE DRAWINGS

These and other features of the disclosure will become more apparent from the following description in which reference is made to the appended drawings wherein:

as illustrated in FIGS. 2-4), such as utilized by the computing device in FIG. 3, according to various embodiments.

FIG. 9 is a flowchart illustrating example operations of a computing device such as the computing device of FIG. 3, in accordance with various embodiments.

DETAILED DESCRIPTION

Figure 1:
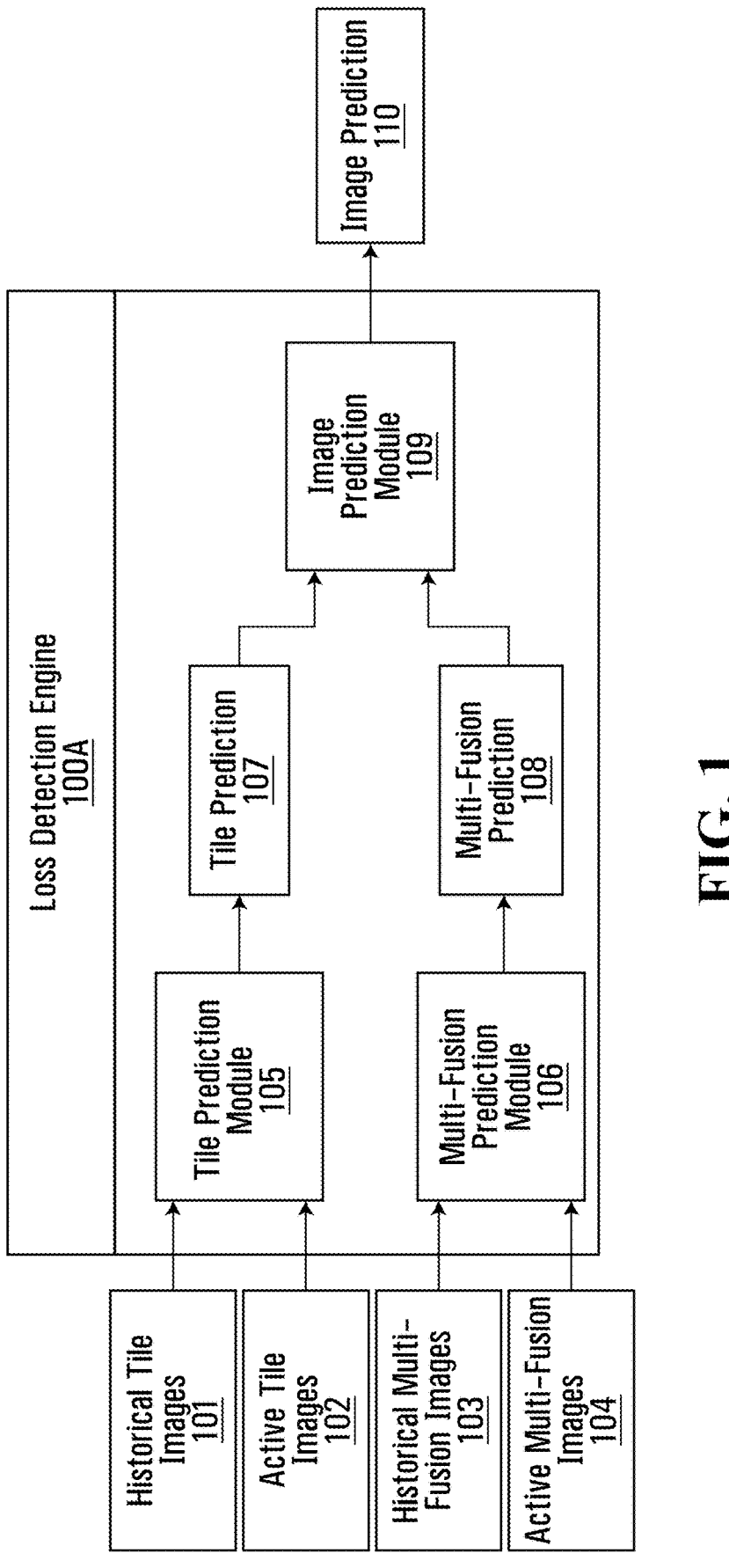
FIG. 1 shows an example loss detection engine, according to various embodiments.

Generally, in at least some embodiments there is provided computer-implemented systems and methods that receive damaged vehicle images and associated vehicle data on the vehicle for which an insurance claim is made, and apply machine learning techniques including neural networks for the images to extract relevant image features and automatically predict the likelihood of vehicle repair or total loss based on vehicle damage and associate vehicle data. In at least some aspects, the received vehicle images are processed prior to analysis and prediction (e.g., by removing or modifying unnecessary image noise and extraneous or irrelevant objects or persons from raw vehicle image data, and/or selecting representative images which provide a view of substantially of all of the vehicle from different angles) such as to improve the efficiency and accuracy of image analysis by computing systems for use in improved prediction, in a dynamic manner, in at least some implementations.

In further embodiments, the disclosed computer implemented systems and methods may generate loss or damage predictions of the vehicle object(s) displayed in the images based on tiled and multi-fusion image sets separately performed using convolutional neural networks followed by classification technique for predicting the image classification (e.g. total loss vs. repairable) and further provide an ensemble prediction based on the combined tiled-imaged based prediction and the multi-fusion image prediction. In at least some aspects, this combined approach of image analysis based on both tiled and multi-fusion images using convolutional neural networks provides a further accuracy of prediction of the category or classification of damage in the vehicle object displayed in the images as it provides a holistic view of extracted feature information to the machine learning models. In yet a further aspect, prior to feeding the images into the convolutional neural networks, the method and system is configured to select and extract optimal images (e.g. corresponding to desired views such as four different views corresponding to different angles of the vehicle-front right side, front left side, rear right side, rear left side) and pre-process such images to remove undesired objects or persons (e.g. detect the vehicle object in the image and crop such that the image contains only the vehicle). In this way, in at least some implementations, a desired overall perspective of each vehicle is obtained in both an individual view of each of the four angle views of the vehicle considered separately and fed into several respective neural networks for image feature extraction for each of the images, and a combination of the four angle view images combined into a singular image and fed into a single neural network for feature extraction from the overall tiled image such as to utilize said combination of features obtained via the tiled and multi fusion images for making a decision about which category the image should be classified as (e.g. total loss, repairable or other category of image). In at least some aspects, this approach may lead to improved feature learning, classification and thereby prediction.

Figure 5:
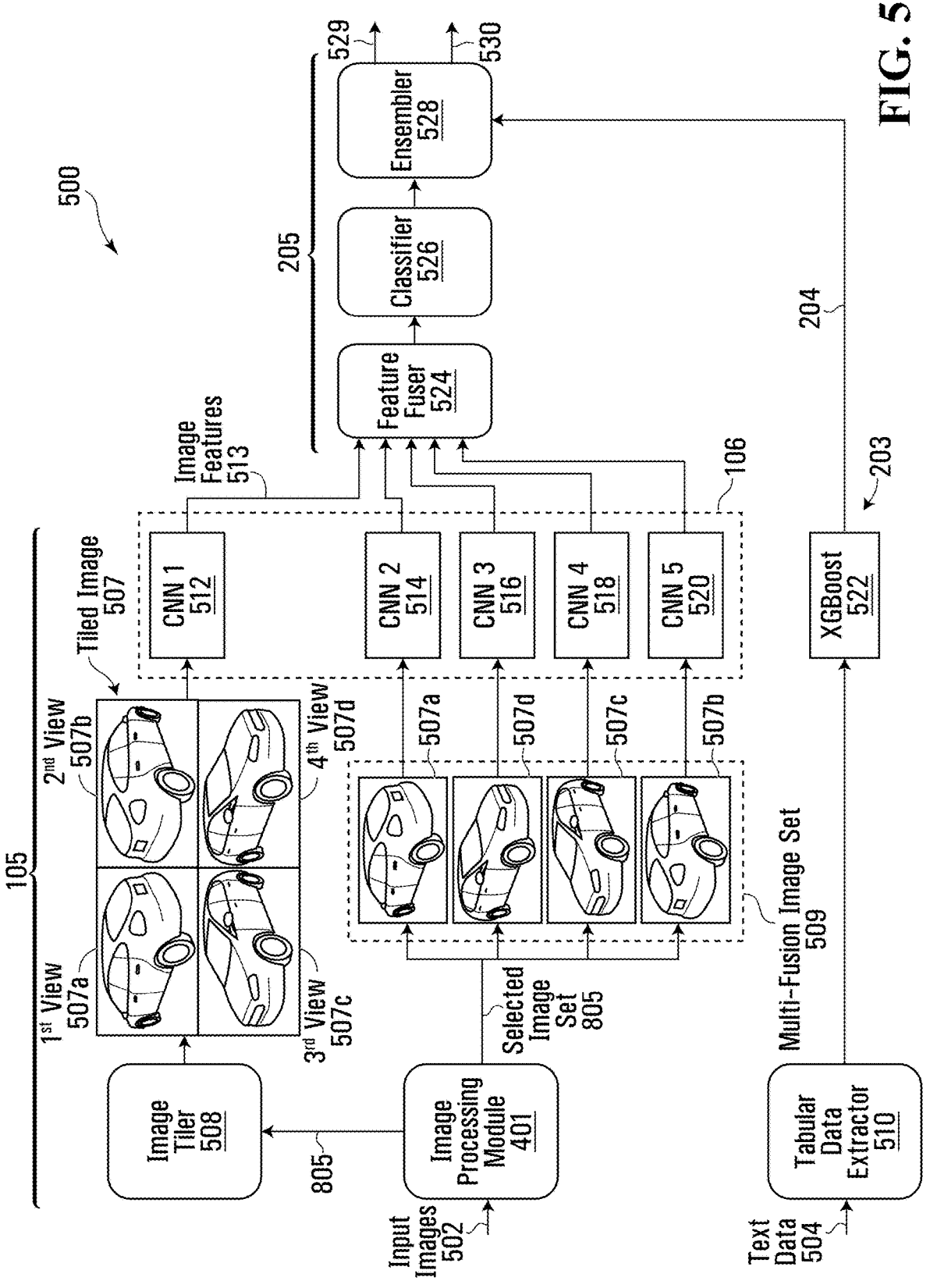
FIG. 5 shows an example configuration of components of a loss detection engine (e.g.
Figure 6:
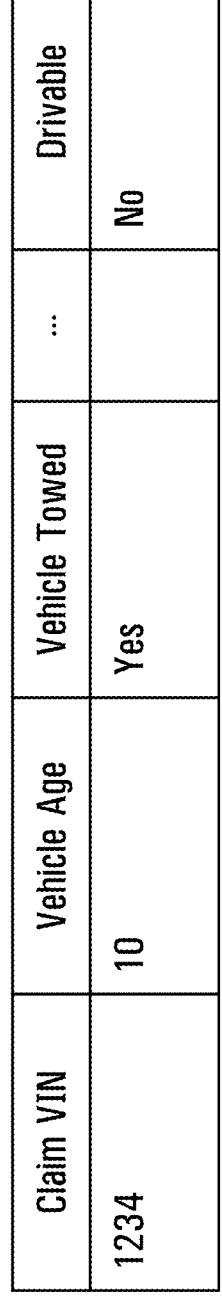
FIG. 6 shows an example of tabular data for use by the loss detection engine of FIGS. 1-5, according to various embodiments.

Referring to FIG. 1 shown is a block diagram that illustrates example components of an example loss detection engine 100A, according to one embodiment. The loss detection engine 100A comprises a set of machine learning computing modules comprising: a tile prediction module 105, a multi-fusion prediction module 106, and an image prediction module 109. In one embodiment, the loss detection engine 100A is configured for using one or more training datasets (e.g. historical tile images 101, historical multi-fusion images 103, active tile images 102, and active multi-fusion images 104) to build, e.g. train, test and generate, each of the prediction modules (e.g. tile prediction module 105, multi-fusion prediction module 106, image prediction module 109) utilizing supervised machine-learning to predict a classification of the images such as likelihood of vehicle repairability, based on assessing a plurality of images of a vehicle for which an insurance claim is made (e.g. active tile images 102, and active multi-fusion images 104). An example of a tiled image and its image components is shown in FIGS. 5 and 6. As will be described herein, the tiled images are formed by merging together multiple views (e.g. front right, front left, rear left and rear right) in a single image. The tiled images may be applied in training by way of historical tile images (e.g. as obtained from past customers and associated vehicle loss data information for claims, including whether a determination of total loss or repair was made) or in operation as active tile images (e.g. unseen images for new customer claims of vehicle damage to be automatically).

Figure 2:
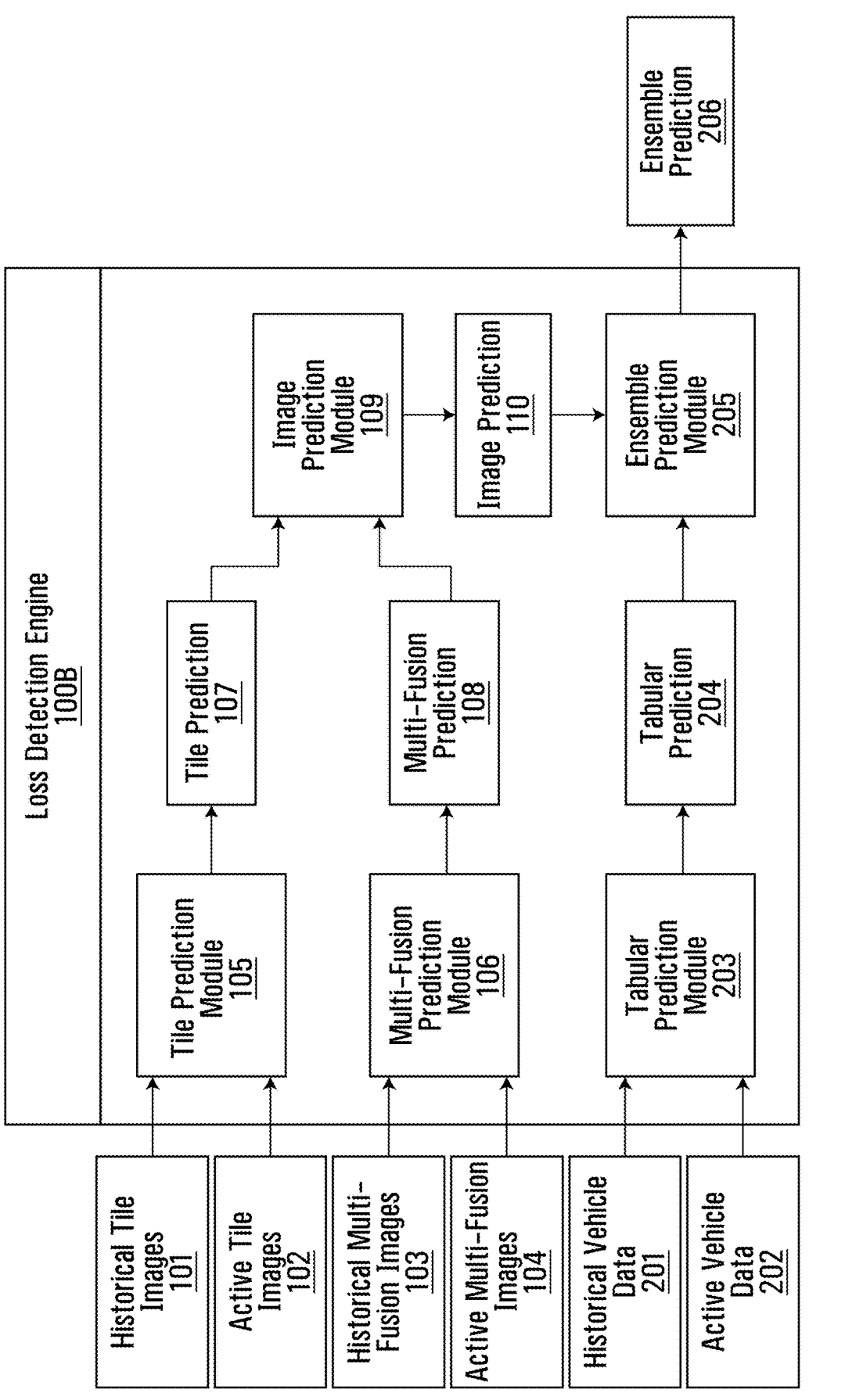
FIG. 2 shows an alternate example loss detection engine, according to various embodiments.
Figure 3:
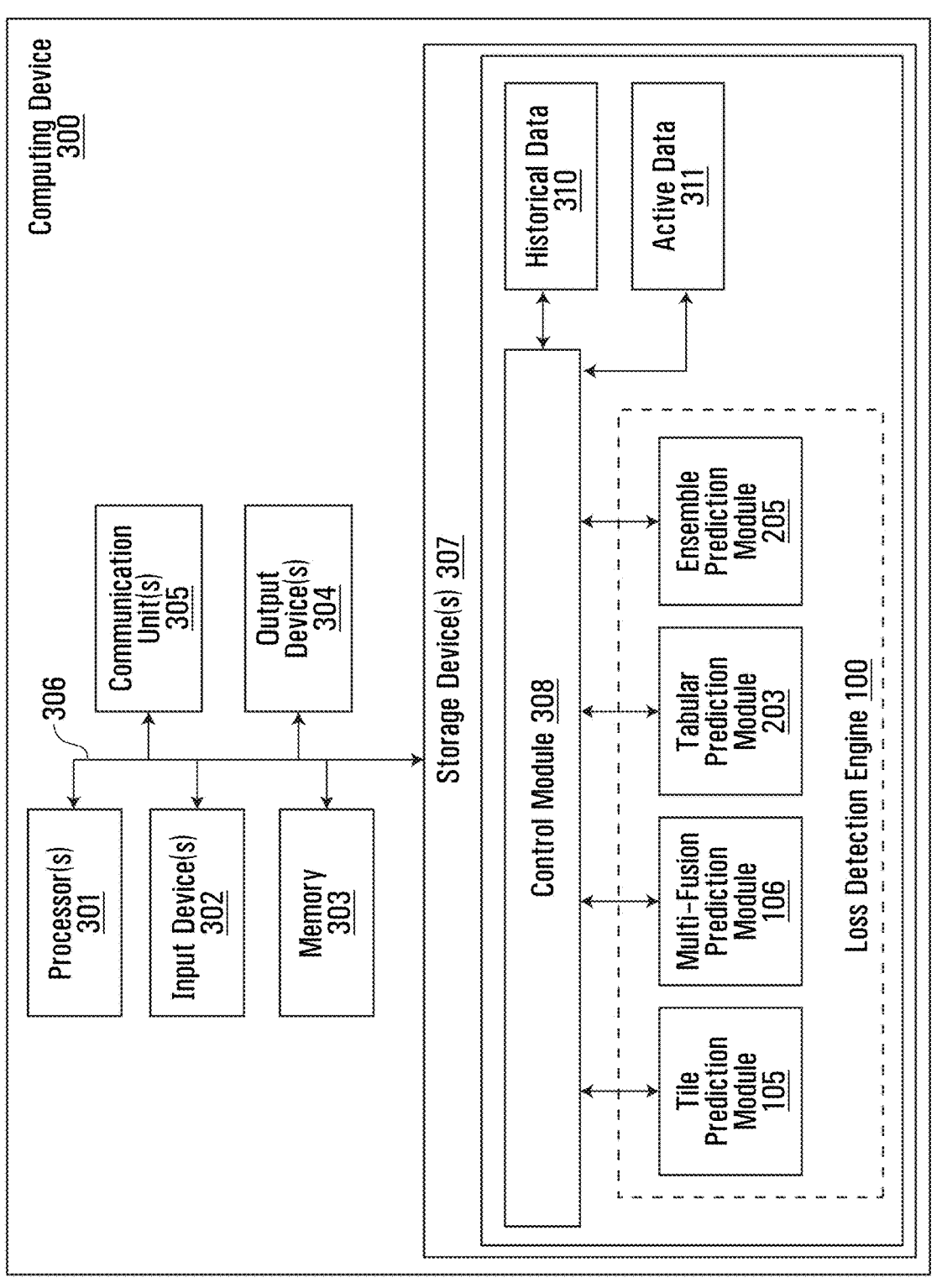
FIG. 3 shows an example computing device, according to various embodiments.
Figure 4:
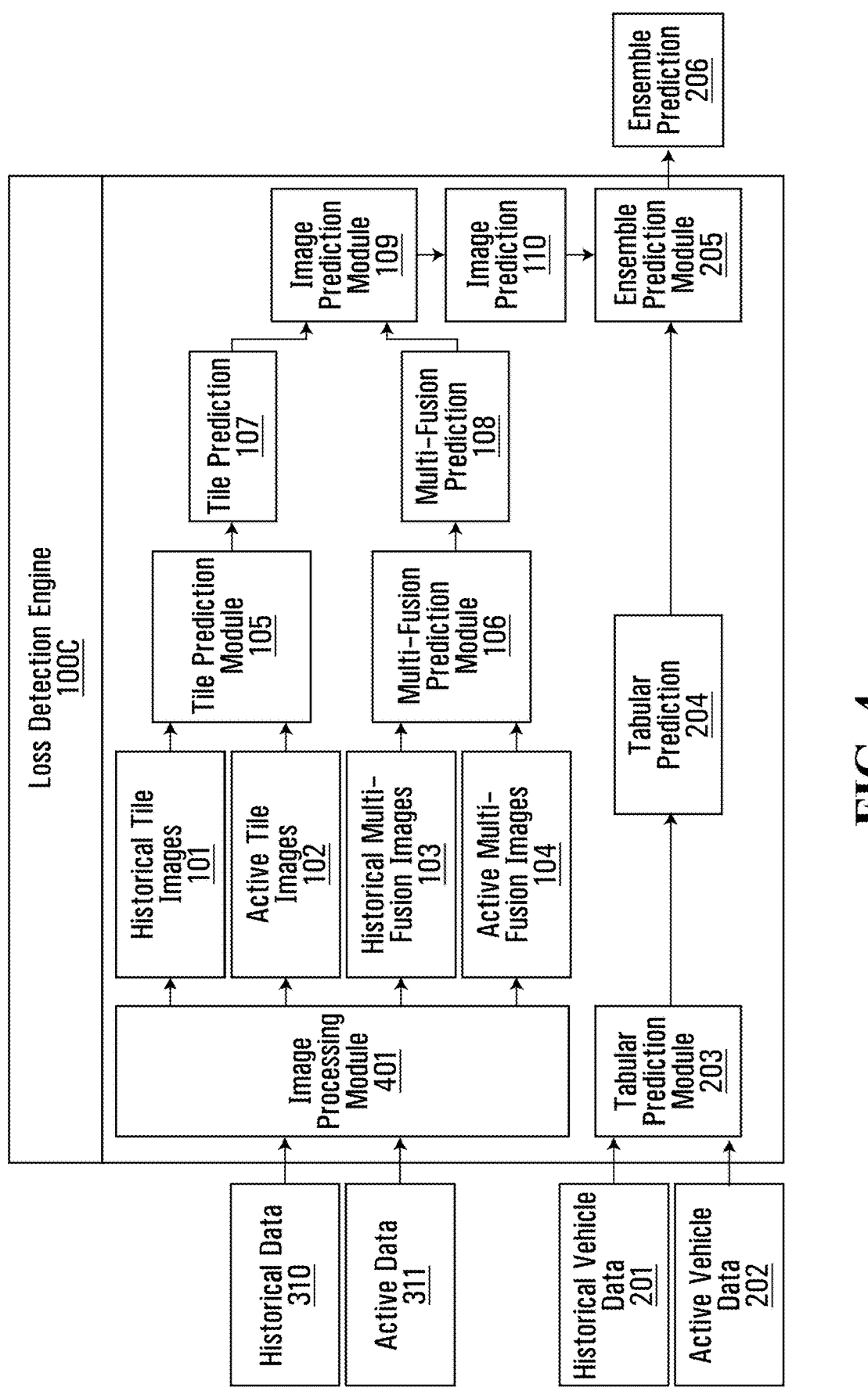
FIG. 4 shows an example loss detection engine including an image processing module for processing input images such as utilized by the computing device in FIG. 3, according to various embodiments.

FIGS. 1, 2 and 4 illustrate various example configurations of loss detection engines, shown as loss detection engine 100A in FIG. 1, loss detection engine 100B in FIG. 2 and loss detection engine 100C in FIG. 4, such loss detection engines may generally be referred to herein as loss detection engine 100 and an example computing device 300 is shown in FIG. 3 for storing and executing the loss detection engine 100, in accordance with various embodiments (or loss detection engine 100A of FIG. 1, loss detection engine 100B of FIG. 2 or loss detection engine 100C of FIG. 4).

The loss detection engine 100A may further comprise one or more data stores or repositories (not shown) for storing historical tile images 101, historical multi-fusion images 103, active tile images 102, and active multi-fusion images 104. In some aspects, one or more components of the tile prediction 107, the multi-fusion prediction 108, and the image prediction 110 may be stored in corresponding data stores or repositories of the loss detection engine 100A (not shown). The historical tile images 101, historical multi-fusion images 103, active tile images 102, and active multi-fusion images 104 may be received from another computing device across a communication network (e.g. a customer device of a computing device of an entity in a networked computer system for the entity) or at least partially provided by a user at a computing device for the loss detection engine 100 (e.g. a computing device 300 shown at FIG. 2). For example, the claim information which includes the underlying images used to subsequently generate the input images to the loss detection engine 100A may be provided on a customer device such as via an application or via a browser and subsequent received at the computing device 300 of FIG. 3 and thereby the loss detection engine 100A of FIG. 1.

The loss detection engine 100A, 100B, 100C (generally referred to as the loss detection engine 100) may include additional computing modules or data stores in various embodiments. Additional computing modules and devices that may be included in various embodiments are not shown in FIGS. 1-4 to avoid undue complexity of description. For example, a user computing device providing the vehicle images and/or claim data, and the network through which the device communicates with the computing device 300 and thereby the loss detection engine 100, for detecting a likelihood of total loss is not illustrated for simplicity.

The loss detection engine 100A is configured for performing a prediction of the classification of the data received, and specifically, a prediction of total loss vs. repair category classification based on the image data received. The loss detection engine 100A is configured for receiving and/or extracting vehicle image data from claim data (e.g. claim data may include documents, text, audio, video, images, etc.) including historical tiled images 101 (e.g. tiled images of vehicles previously assessed and labelled as repairable or total loss vehicles for use in training the model), historical multi-fusion images 103 (e.g. multi-fusion images of vehicles previously assessed as repairable or total loss vehicles for use in training the model), active tiled images 102 (e.g. tiled images of vehicle for which an insurance claim has currently been made and is outstanding at a present time), and active multi-fusion images 104 (e.g. multi-fusion images of vehicle for which an insurance claim has been made and is outstanding at a present time).

Figure 8:
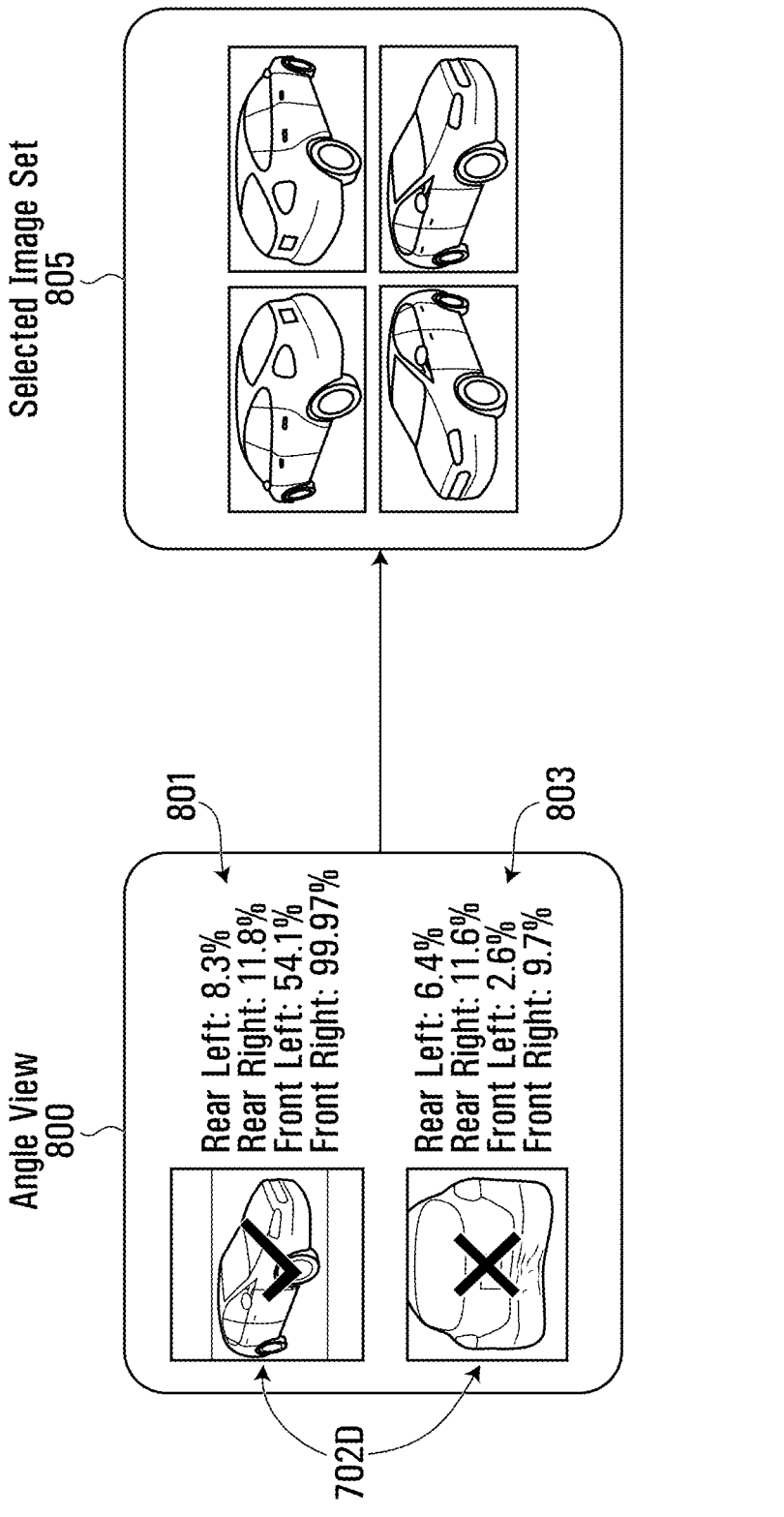

Generally, as discussed herein, multi-fusion images (e.g. as may be applied to active multi-fusion images 104 or historical multi-fusion images 103) are images for use by the multi-fusion prediction module 106. Preferably, these are a set of four images, whereby each image singularly displays a digital photograph for each angle of the desired object, namely the car-front right, front left, rear left and rear left. An example of this is shown in FIG. 5, where a single picture is selected, extracted or otherwise provided for each angle of the car thus providing a full view of the car from all around as shown in the multi-fusion image 509 set comprises a first view 507a, a second view 507b, a third view 507c and a fourth view 507d. Another example is illustrated in FIG. 8 of the set of images extracted for use by the multi-fusion prediction module 106. In at least some aspects, a further machine learning model (not shown but may be provided by the image processor 506 or the image processing module 401) is trained to detect and extract the angle of the car based on prior tagged images with the right angle and select a single image showing a single vehicle object as shown in each of the images of the multi-fusion image 509 set.

Notably, the multi-fusion prediction module 106 is configured to receive or otherwise extract a particular set of multi-fusion images (e.g. one digital photo or image for each angle of the vehicle, as shown in the example of views 507a-507d) and retrieve a respectively configured machine learning model (e.g. convolutional neural network (CNN) such as the example CNN2-CNN5 shown in FIG. 5) for each of the image views (e.g. the front right view may have a respective particular CNN model) and each for extracting CNN based features therefrom, then fuse the CNN extracted features from all of the CNN models and then extract information therefrom for predicting whether a vehicle is totaled (total loss) or repairable based on a classifier being trained on historical multi-fusion images 103. Generally, in at least some aspects, each convolutional neural network is trained to recognize and assess damage based on training the model from prior historical images and associated assessments.

Referring to FIGS. 1 and 5, the loss detection engine 100A is further configured for extracting relevant features of the image data via each of the tile prediction module 105 and the multi-fusion prediction module 106 (e.g. CNN based features extracted for each image—the tiled image 507, and each image of the multi-fusion image 509 set shown as example image features 513); predicting the likelihood of vehicle repairability based on the input tiled images (e.g. output as tile prediction 107) via a machine-learning based loss detection module (e.g. tile prediction module 105); predicting the likelihood of vehicle repairability based on the multi-fusion images (e.g. output as multi-fusion prediction 108 in FIG. 1) via a machine-learning based loss detection module (e.g. multi-fusion prediction module 106); predicting the likelihood of vehicle repairability based on the tiled based prediction (e.g. tile prediction 107) and multi-fusion based prediction (e.g. multi-fusion prediction 108) via a machine-learning based loss detection module (e.g. image prediction module 109).

Tile prediction module 105 generates, using machine learning, a tile prediction 107 (e.g. categorizing a vehicle as likely repairable or likely a total loss) based on active tiled images 102 (e.g. a tiled image of a vehicle showing extensive damage indicates likely total loss vehicle), having been trained on historical tiled images 101 (e.g. having been tagged with tagged tiled images which are labelled with a loss category of total loss vs repair). Multi-fusion prediction module 106 generates, using machine learning, a multi-fusion prediction 108 (e.g. categorizing a vehicle as likely repairable or likely a total loss) based on active multi-fusion images 104 (e.g. the multi-fusion images of a vehicle showing extensive damage indicates likely total loss vehicle), having been trained on historical multi-fusion images 103. Image prediction module 109 generates an image prediction 110 (e.g. categorizing a vehicle as likely repairable or likely a total loss) based on a combination of a tile prediction 107 and a multi-fusion prediction 108. That is, the image prediction module 109 is configured to ensemble or combine the prediction of the two input models (e.g. tile prediction module 105 and multi-fusion prediction module 106) and generate a combination confidence score as to whether repairable or total loss classification from the input images provided by both the multi fusion and tiled image sets. Notably, in at least some implementations, the image prediction module 109, may be configured to average the confidence scores provided by each of the tile prediction 107 and multi-fusion prediction 108 (e.g. respectively the tile prediction module 105 and the multi-fusion prediction module 106) such as to generate the image prediction 110.

As shown in FIG. 2, input to a loss detection engine (e.g. the loss detection engine 100B) may additionally include historical account data in the form of historical vehicle data 201 (e.g. previous account activities such as account debits and credits; frequency of account use; last account transaction; account properties such as associated credit limits, account address, account opening date; previous account compromise events; previous fraudulent transaction requests) and active account data in the form of active vehicle data 202 (e.g. account data related to outstanding claims under consideration as to whether total loss or repairable). The account data may be input by a customer on a user device communicating with the computing device 300 and/or extracted from claim document provided as part of a claim to the computing device 300.

Referring to FIG. 2 shown is a block diagram which illustrates components of an example loss detection engine 100B, according to an implementation. In an implementation, the loss detection engine 100B is similar to the loss detection engine 100A with the exception of the features discussed herein. The loss detection engine 100B may also be implemented by the computing device 300 of FIG. 3 (shown generally as the loss detection engine 100). In an implementation, the loss detection engine 100B is additionally configured to receive and process additional data in other non-image formats (e.g. text extracted from claim information such as documents, electronic communications including text, SMS, e-mail, . . . between a customer device for inputting a vehicle claim in relation to a damaged vehicle and the computing device 300 for receiving same and making a decision therefrom, etc.). The loss detection engine 100B is further configured for receiving and/or extracting claim related data such as the account data into tabular vehicle data (e.g. historical vehicle data 201, active vehicle data 202), receiving vehicle image data as discussed with reference to FIG. 1, including historical tiled images 101 (e.g. tiled images of vehicles previously assessed as repairable or total loss vehicles), and historical multi-fusion images 103 (e.g. multi-fusion images of vehicles previously assess as repairable or total loss vehicles), active tiled images 102 (e.g. tiled images of vehicle for which an insurance claim has been made and is outstanding), and active multi-fusion images 104 (e.g. multi-fusion images of vehicle for which an insurance claim has been made and is outstanding). Based on these inputs, the loss detection engine 100B is configured for extracting relevant features of the data (e.g. CNN based feature extraction for the input images processed by the tile prediction module 105 and the multi-fusion prediction module 106 and XGBoost based feature extraction for the tabular prediction module 203); predicting the likelihood of vehicle repairability based on the tiled images (e.g. tile prediction 107) via a machine-learning based loss detection module (e.g. title prediction module 105); predicting the likelihood of vehicle repairability based on the multi-fusion images (e.g. multi-fusion prediction 108) via a machine-learning based loss detection module (e.g. multi-fusion prediction module 106); predicting the likelihood of vehicle repairability based on the tiled based prediction (e.g. tile prediction 107) and multi-fusion based prediction (e.g. multi-fusion prediction 108) via a machine-learning based loss detection module (e.g. image prediction module 109); predicting the likelihood of vehicle repairability based on the tabular data (e.g. tabular prediction 204) via a machine-learning based loss detection module (e.g. tabular prediction module 203); predicting the likelihood of vehicle repairability based on a combination of the image based prediction (e.g. image prediction 110) and the tabular data based prediction (e.g. tabular prediction 204) via a machine-learning based ensemble prediction (e.g. ensemble prediction module 205). The ensemble prediction module 205 may be configured to average the confidence scores output from the image prediction 110 and the tabular prediction 204 to output the ensemble prediction 206.

An example of the data (e.g. active vehicle data 202 or historical vehicle data 201) formatted as tabular data is shown in FIG. 6 as tabular input data 602. The tabular prediction module 203 preferably receives the historical vehicle data 201, or the active vehicle data 202 in a tabular format or converts the data to same. The tabular data is structured into rows and columns, each row contains information about a vehicle/claim related feature for that column. Each new row may relate to a different vehicle or claim altogether. The historical vehicle data 201 and active vehicle data 202 may include current or prior historical data relating to but not limited to: vehicle year, whether vehicle was towed, loss causes such as water damage, claim information, vehicle age, whether vehicle is drivable, vehicle model, vehicle features, and air bags deployed or not, etc.

Thus, generally referring to FIGS. 2-6, the loss detection engine 100 is configured to receive and process different modality of data (e.g. digital images of a vehicle and tabular data related to the vehicle claim) and determine a prediction of loss based on both the image based prediction (e.g. CNN based) and tabular data prediction (e.g. XGBoost) as shown in FIG. 5. Each of these models is trained separately to determine and detect based on corresponding types of expected inputs (e.g. image containing a singular vehicle object taken from a particular angle, or tabular data related to the claim or tiled image containing multiple vehicle objects from different angles) and such prediction is combined (e.g. averaged) to determine a detection of decision on the classification of the input data (e.g. does it indicate total loss or repairable vehicle?).

Tabular prediction module 203 generates a tabular prediction 204 (e.g. categorizing a vehicle as likely repairable or likely a total loss) based on active vehicle data 202 (e.g. relating to an outstanding claim such as a report from a tow truck indicated a major vehicle fire reduces the likelihood of repairability), having been trained on historical vehicle data 201 (e.g. tagging historical vehicle information such as features of the claim related information and values of the features for the vehicle in tabular format to whether an assessment of total loss or repair was previously made in a prior time period). Ensemble prediction module 205 generates an ensemble prediction 206 (e.g. categorizing a vehicle as likely repairable or likely a total loss) based on based on a combination of an image-based prediction (e.g. image prediction 110) and tabular data-based prediction (e.g. tabular prediction 204). In at least some implementations, this includes averaging the confidence scores of the image based prediction and the tabular based prediction).

FIG. 3 illustrates a block diagram depicting example computer components of an example computing device, such as a computing device 300 for providing the loss detection engine 100 and corresponding components described with respect to FIGS. 1, 2, 4, and 5, in accordance with one or more aspects of the present disclosure.

The computing device 300 comprises one or more processors 301, one or more input devices 302, one or more communication units 305, one or more output devices 304 (e.g. providing one or more graphical user interfaces on a screen of the computing device 300) and a memory 303. Computing device 300 also includes one or more storage devices 307 storing one or more computer modules such as the loss detection engine 100, a control module 308 for orchestrating and controlling communication between various modules and data stores of the loss detection engine 100, historical data 310 (e.g. which may comprise image or textual data related to a vehicle and historical claims such as historical tile images 101, historical multi-fusion images 103, historical vehicle data 201) and active data 311 (e.g. active tile images 102, active multi-fusion images 104, active vehicle data 202). The computing device 300 may comprise additional computing modules or data stores in various embodiments. Additional computing modules and device that may be included in various embodiments, are not shown in FIG. 3. to avoid undue complexity of the description, such as communication with one or more other computing devices, such as customer devices or entity devices for processing claims as applicable, for obtaining the historical data 310 and/or the active data 311 including via a communication network, not shown.

Communication channels 306 may couple each of the components including processor(s) 301, input device(s) 302, communication unit(s) 305, output device(s) 304, memory 303, storage device(s) 307, and the modules stored therein for inter-component communications, whether communicatively, physically and/or operatively. In some examples, communication channels 306 may include a system bus, a network connection, an inter-process communication data structure, or any other method for communicating data.

One or more processors 301 may implement functionality and/or execute instructions within the computing device 300. For example, processor(s) 301 may be configured to receive instructions and/or data from storage device(s) 307 to execute the functionality of the modules shown in FIG. 3, among others (e.g. operating system, applications, etc.).

Computing device 300 may store data/information (e.g. historical data 310 and/or the active data 311); previous repairability predictions (e.g. ensemble prediction module 205) to storage device(s) 307.

One or more communication units 305 may communicate with external computing devices via one or more networks by transmitting and/or receiving network signals on the one or more networks. The communication units 305 may include various antennae and/or network interface cards, etc. for wireless and/or wired communications.

Input devices 302 and output devices 304 may include any of one or more buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel (e.g. 306).

The one or more storage devices 307 may store instructions and/or data for processing during operation of the computing device 300. The one or more storage devices 307 may take different forms and/or configurations, for example, as short-term memory or long-term memory. Storage device(s) 307 may be configured for short-term storage of information as volatile memory, which does not retain stored contents when power is removed. Volatile memory examples include random access memory (RAM), dynamic random access memory (DRAM), static random access memory (SRAM), etc. Storage device(s) 307, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable read-only memory (EPROM) or electrically erasable and programmable read-only memory (EEPROM).

The computing device 300 may include additional computing modules or data stores in various embodiments. Additional modules, data stores and devices that may be included in various embodiments may be not be shown in FIG. 3 to avoid undue complexity of the description. Other examples of computing device 300 may be a tablet computer, a person digital assistant (PDA), a laptop computer, a tabletop computer, a portable media player, an e-book reader, a watch, a customer device, a user device, or another type of computing device.

Referring to FIG. 4 shown is a block diagram which illustrates components of an example loss detection engine 100C, according to an implementation. In an implementation, the loss detection engine 100C is similar to the loss detection engine 100A and 100B in FIGS. 1-2 with the exception of the features discussed herein. The loss detection engine 100C may also be implemented by the computing device 300 of FIG. 3 (shown generally as the loss detection engine 100). In an implementation, the loss detection engine 100C further comprises an image processing module 401. The image processing module 401 is configured to process the input claim data received which may be in multiple different types of modes (e.g. images, text, or combinations thereof) as provided by the historical data 310 and the active data 311 and extract relevant information therefrom to generate the historical tile images 101, active tile images 102, the historical multi-fusion images 103, and active multi-fusion images 104.

The image processing module 401 may be configured to receive noisy and dirty data (e.g. different angles, different light quality, different resolution, and an excessive number of images) and process into clean, relevant data useful for the prediction modules to make determinations and assessments.

The image processing module 401 may receive data in various formats and types. For example, the image processing module 401 may receive digital images related to an accident including the vehicle (but may also receive various other unrelated images or images containing the vehicle as well as irrelevant objects) as well as other documents such as financial bills related to the vehicle accident.

Figure 7:
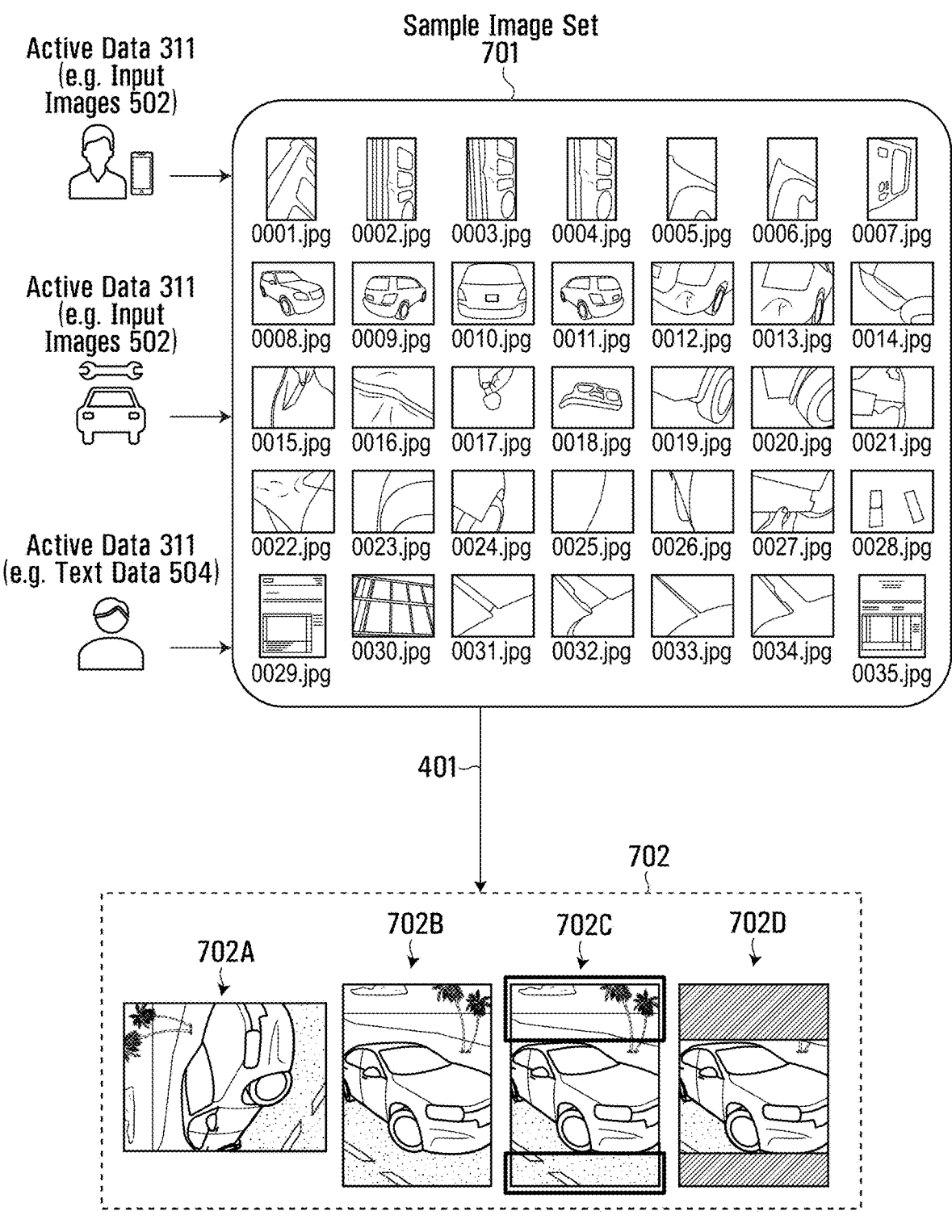
FIGS. 7 and 8 show an example of pre-processing images to extract desired image information and generate suitable images for use by the loss detection engine of FIGS. 1-5, according to various embodiments.

The image processing module 401 may first perform a "car cropper" operation which may perform one or more of: identifying a desired image containing a vehicle, rotating to a desired view, cropping the photo to include only the vehicle object of interest and cleaning images by filtering noise. That is, it determines from all of the input documents and digital pictures (e.g. as input directly via customer device or a repair shop, etc. provided to the module) of which image from the set of available images contains a vehicle and filters out the images which do not contain a vehicle. Preferably, the image processing module 401 contains an object detection model to detect a vehicle in the images and returns a defined area of the object of interest as well as sensing the rotation of the vehicle (e.g. detecting where the car is located in the image and what is the orientation of the car in the image such as to perform cropping and rotation). Thus the car cropper operation performed includes a machine learning model trained for a specific task of recognizing cars and their orientation in an image such as to perform rotation to a correct orientation and cropping. Thus, the image processing module 401 may be configured to filter out images which do not include a car, then rotate the images to the correct orientation and cropping parts of the image which do not include the vehicle. Advantageously, such cropping may reduce bias of the prediction performed by the loss detection engine 100C. For example, FIG. 7 illustrates an example of the input claim data, shown as sample image set 701, (e.g. textual and/or image and/or other modes of claim related data for a vehicle accident) which may form the active data 311 and/or historical data 310 input to the loss detection engine 100C. From the sample image set 701, it may be seen that a single claim may be associated with a large number of images and many of which may not be useful by use in the loss detection engine 100C for total loss determination. The sample image set 701 may be processed by the car cropper module (not shown) of the image processing module 401 in a series of image outputs 702 to select an initial image containing a vehicle shown at a first image 702A, rotate the image to a desired view shown at a second image 702B, crop the undesired portion of the image shown at a third image 702C, and generate a cropped final image 702D containing a vehicle and removing other portions of the image which do not contain a vehicle.

Referring now to FIGS. 4, 7 and 8, a second stage of the image processing module 401 may comprise detecting an angle of the object (e.g. vehicle) in each image such as to select a single image for each of the desired four angles of the vehicle (e.g. front right, front left, rear left and rear right) and output as a selected image set 805. This model provides a holistic view of the vehicle and ensures consistent inputs to the prediction modules of the loss detection engine 100C. An example operation of the second stage of the image processing module 401 is illustrated in FIG. 8. The second stage may receive a set of cropped final images 702D and detect an ideal image for all four angles of the vehicle based on determining a confidence score for each angle and select for each of the angles, the ideal image based on a highest confidence score for that angle. For example, as illustrated in an angle view 800 which may be a user interface display screen for presenting the results of the image processing module, there is shown at the top image a first set of confidence scores 801 for each of the angles of the vehicle in the top image and a second set of confidence scores 803 for each of the angles of the vehicle in the bottom image. Based on this, the top image having a highest confidence score for a particular view (e.g. front right) is selected and output in the selected image set 805. The selected image set 805 is then fed in FIG. 4 (also see FIG. 5) to the prediction modules for assessing the total loss (e.g. to form the historical tiles images 101, active tile images 102, historical multi-fusion images 103, and active multi-fusion images 104). Namely, the image processing module 401 detects and outputs the four best images of the vehicle for all four angles of the vehicle (e.g. selected image set 805) to provide a full view of the vehicle based on the confidence score to pick the best image for a particular angle such as to improve prediction and provide a consistent input to the prediction modules. Referring again to FIG. 8, lower image in the angle view 800 is rejected and filtered out as its confidence score for all of the angle categories is below a defined threshold (e.g. as may be predefined in the image processing module 401) and it does not form part of the selected image set 805. The image processing module 401 may be configured to determine a confidence score for each angle based on having been trained on labelled data corresponding to the right angles such as to assist the image processing module 401 to detect a confidence score for each possible angle type.

Thus, the image processing module 401 provides a single image for each of the four angles to the prediction modules which follow to predict total loss from the input images.

Referring to FIGS. 5 and 9, an example operation 500 (shown as operation 900 in FIG. 9) and components of the prediction modules of FIGS. 1-4 are further illustrated. As shown in FIG. 5, initially, input images 502 are provided to the image processing module 401. An example of such input images 502 are shown in the sample image set 701 in FIG. 7 and may be contained within historical data 310 or active data 311, depending on whether the prediction modules are under the training, testing or execution phase. Once the input images are processed by the image processing module 401, four images are generated corresponding to the best image for each of the angles of the vehicle, thereby providing a complete view of the vehicle. The generated images are shown as selected image set 805 (also see FIG. 8 as another example of output images generated). In this way, the image processing module 401 provides consistent views, and leverage a most suitable image for each of the four angles of the damaged vehicle based on a determined confidence score.

Once the four images are generated, they are provided to the prediction modules, namely, the tile prediction module 105 and the multi-fusion prediction module 106.

The tile prediction module 105 may further comprise an image tiler 508 which initially takes the set of four input images and combines the four images into a single image shown as the tiled image 507 (e.g. an example of active tile images 102). The tiled image 507 provides a holistic view of all four angles of the vehicle (e.g. first view 507a, second view 507b, third view 507c, and fourth view 507d). For example, the tiled image 507 contains the set of four underlying view angle images, such that a single image is subdivided into four portions by a regular grid in optical space and each section of the grid or tile is rendered separately such as to show a different angle view in each of the four portions of the tiled image 507. This tiled image 507 (also shown as active tiled images 102 in FIG. 4) contains multiple angles of the vehicle in a singular image is fed into a first convolutional neural network (CNN1) 512. The CNN1 512 has been trained and tested for tiled images (e.g. based on historical tile images 101 and corresponding relevant image features to the determination of total loss) to extract a set of CNN image related features (e.g. edges, vertical lines, horizontal lines, bends, corners, shapes, textures, objects, etc.), shown as image features 513 relevant to the classification of the image. In a parallel process, the image processing module 401 also feeds the selected image set 805 containing the set of four distinct images of the desired four angles to the multi-fusion prediction module 106. The four distinct images are separated out as a first view 507a, second view 507b, third view 507c, and fourth view 507d which formulate the multi-fusion image 509 set (e.g. an example of the active multi-fusion images 104 during execution of the loss detection engine 100) and each image corresponding to a different and unique angle view of the vehicle object is fed into a respective CNN model (e.g. CNN2 514, CNN3 516, CNN4 518, CNN5 520) that has been specifically trained and tested for that particular angle view (e.g. using historical multi-fusion images 103). Each CNN model 514, 516, 518, and 520 is configured to extract CNN specific image features 513 for that corresponding specific angle view of the vehicle for which it has been trained by the multi-fusion prediction module 106. Thus, each image in the multi-fusion image 509 has its own machine learning model and the results of the extracted features are combined together. Notably, each of the images is processed individually and then the image features 513 fused together via a feature fuser 524 for subsequently performing a prediction based on the features.

Referring to FIGS. 1-5, in at least some aspects, the ensemble prediction module 205 may comprise a feature fuser 524, a classifier 526 and an ensembler 528 for providing a prediction of a total loss state 529 or repairable state 530.

Once the features are fused together, it allows different types of images to be considered and information extracted therefrom. For example, each CNN may be configured to extract fixed length representation features from each image and then concatenated together in the feature fuser 524 into one bigger representation of all of the image. The classifier 526 is then configured, based on being previously trained on prior historical data to determine from the features whether a car is totalled or not as per the input information.

In the embodiment of FIG. 5, the tabular prediction module 203 comprises a tabular data extractor 510 for receiving and processing text data 504 (e.g. historical vehicle data 201 or active vehicle data 202) to generate a tabular prediction 204 based on applying the data to an XGBoost 522 model that has been trained separately from other models for detecting a likelihood of total loss versus repair state from tabular data having a predefined set of features and corresponding values. The combination of the prediction from the images and the prediction from the tabular data is provided to the ensembler 528 which performs an average of the confidence scores in order to output a likelihood prediction of total loss state 529 versus repair state 530 based on the input images 502 and the input text data 504 defining a particular claim for which the images relate to.

As described herein, in at least some embodiments, the ensembling process combines the predictions of the two image prediction models of tile and multi-fusion together to form a new prediction for the image and also simultaneously performs and combines the prediction of tabular data such as to boost the overall model as presented in FIG. 5 thereby providing a holistic view of the image features and data features to provide a computer implemented advantage in at least some aspects of features extraction from images and data for improving automatic classification of said input information of multi-modes.

Referring to FIG. 9, shown is a flowchart of operations 900 which may be performed by the computing device 300 of FIG. 3. The computing device may comprise a processor configured to communicate with a display to provide a graphical user interface (GUI), examples of such graphical user interface outputs shown in FIGS. 7 and 8 where the computing device receives claim related information for a vehicle being assessed for a categorization of damage and to display a decision relating to the vehicle on the graphical user interface as determined from multi-modes of information (e.g. image and text information) provided in the claim data. The computing device further comprises instructions (stored on a non-transient storage device), which when executed by the processor configure the computing device to perform operations such as the operations 900.

At step 902, operations are configured to receive a set of four distinct and separate images of a vehicle (e.g. selected image set 805 in FIG. 8, or active data 311), each image corresponding to a different defined angle view of the vehicle selected as being of interest for a corresponding angle view (e.g. front right, front left, rear left and rear right) to provide a full view of the vehicle from all around, the images selected from a plurality of possible images in relation to a claim for the vehicle. As shown in FIG. 7, a large image sample size may be input carrying irrelevant and extraneous information, each image in such sample set shown as the sample image set 701 is processed (e.g. cropped, rotated, removed noise, etc.) and an ideal fitted image based on a confidence score is selected for each view as shown in FIG. 8 whereby images with low confidence scores are filtered out until the desired set is achieved.

At step 904, the operations generate a tiled image of the vehicle by combining the set of four images into a single image concurrently displaying all four images of the respective views in equal portions of the tiled image. Examples of such tiled images are shown in FIG. 5 with the tiled image 507 displaying a first view 507a, a second view 507b, a third view 507c, and a fourth view 507d concurrently within a single image. Such image may have a lower resolution that the images considered by the multi-fusion prediction module 106 but provide an alternate and holistic view of the image features for processing and prediction.

At step 906, the operations input the tiled image to a first convolutional neural network (e.g. CNN1 512 shown in FIG. 5), the first convolutional neural network trained based on historical tiled image data (e.g. historical tile images 101 in FIGS. 1-4) to extract a first set of image features from tiled images relevant for predicting a first likelihood of total loss for the vehicle (e.g. tile prediction 107).

At step 908, the operations input a multi-fusion set of images (e.g. multi-fusion image 509 in FIG. 5 consisting of individual images displaying a first view 507a, a second view 507b, a third view 507c, and a fourth view 507d individually and without overlap). Thus the multi-fusion images comprise the set of four distinct images individually into a second set of distinct and separate convolutional neural networks (e.g. CNN2 514; CNN3 516, CNN4 518 and CNN5 520) each configured and trained for separately receiving a different non-overlapping view of the vehicle and trained using historical multi-fusion images (e.g. historical multi-fusion images 103) to extract a second set of image features (e.g. 513) from multi-fusion images relevant to the likelihood, and fusing together the second set of images features for predicting, via a classifier, a second likelihood of total loss for the vehicle (e.g. multi-fusion prediction 108).

At step 910, the operations aggregate the first, second and third likelihood of total loss vehicle to perform an average of a confidence score associated with each likelihood (e.g. see the feature fuser 524 combined with the classifier 526 and ensembler 528 in FIG. 5; or the ensemble prediction module 205 combining the image prediction 110 and the tabular prediction 204 to generate an ensemble prediction 206) to determine an ensemble prediction of a classification of image and tabular data thereby an overall likelihood of whether the vehicle is likely to be repairable or total loss (e.g. see also output from FIG. 5).

One or more currently preferred embodiments have been described by way of example. It will be apparent to persons skilled in the art that a number of variations and modifications can be made without departing from the scope of the disclosure as defined in the claims.

What is claimed is:

1. A computer system for processing a plurality of digital images, the computer system comprising:
   a processor;
   a non-transient computer-readable medium comprising instructions that, when executed by the processor, cause the processor to:
   determine a location of a vehicle and define a bounding box that surrounds the location based on an object detection machine learning model being applied to distinct images of the vehicle;
   crop the distinct images to display only the vehicle and rotate the distinct images to a defined orientation;
   generate a tiled image of the vehicle the distinct images being combined into a single image of different angle views in equal portions of the tiled images;
   process the generated tiled image via a first convolutional neural network configured to process images and trained based on historical tiled image data to extract a first set of image features from tiled images to predict a first likelihood of total loss for the vehicle; and
   process via a second set of distinct and separate convolutional neural networks a multi-fusion set of images that comprise the set of distinct images, each of the second set of convolutional neural networks trained for a different non-overlapping view of the vehicle, with historical multi-fusion images, to extract a second set of image features from multi-fusion images to predict a second likelihood of total loss for the vehicle.

2. The computer system of claim 1, wherein the instructions, when executed, further cause the processor to rotate each cropped image to the defined orientation.

3. The computer system of claim 1, wherein the tiled image includes at least two cropped images combined into the single image.

4. The computer system of claim 1, wherein each of the images in the set of cropped images show the vehicle from a different view.

5. The computer system of claim 4, wherein the first convolutional neural network is applied to extract the first set of image features and the second set of distinct convolutional neural networks each trained for a particular view of the vehicle is applied as the respective machine learning model to extract the second set of image features.

6. The computer system of claim 1, wherein the different angle views are pre-defined.

7. The computer system of claim 6, wherein the instructions, when executed, further cause the processor to apply an image recognition machine learning model to classify cropped images as belonging to respective pre-defined views.

8. The computer system of claim 1, wherein the respective machine learning models process images with non-overlapping views of the vehicle.

9. The computer system of claim 1, wherein, to predict the likelihood of total loss, the instructions cause the processor to:
   predict the first likelihood of total loss based on the first set of extracted features;
   predict the second likelihood of total loss based on the second set of extracted features; and
   predict the likelihood of total loss based on the first likelihood of total loss and the second likelihood of total loss.

10. The computer system of claim 9, wherein, to determine the second likelihood of total loss, the instructions cause the processor to fuse together the second set of extracted features.

11. A computer implemented method for processing a plurality of digital images, the computer implemented method comprising:
   determining a location of a vehicle and defining a bounding box surrounding the location based on applying an object detection machine learning model to distinct images of the vehicle;
   cropping the distinct images to display only the vehicle and rotating the distinct images to a defined orientation;
   generating a tiled image of the vehicle by combining the distinct images into a single image of different angle views in equal portions of the tiled image;
   processing the generated tiled image via a first convolutional neural network configured for image processing and trained based on historical tiled image data to extract a first set of image features from tiled images to predict a first likelihood of total loss for the vehicle; and
   processing via a second set of distinct and separate convolutional neural networks a multi-fusion set of images comprising the set of distinct images, each of the second set of convolutional neural networks trained for a different non-overlapping view of the vehicle, using historical multi-fusion images, to extract a second set of image features from multi-fusion images to predict a second likelihood of total loss for the vehicle.

12. The computer implemented method of claim 11, further comprising rotating each cropped image to the defined orientation.

13. The computer implemented method of claim 11, wherein the tiled image includes at least two cropped images combined into the single image.

14. The computer implemented method of claim 11, wherein each of the images in the set of cropped images show the vehicle from a different view.

15. The computer implemented method of claim 14, wherein the first convolutional neural network is applied to extract the first set of image features and the second set of distinct convolutional neural networks each trained for a particular view of the vehicle is applied as the respective machine learning model to extract the second set of image features.

16. The computer implemented method of claim 11, wherein the different angle views are pre-defined.

17. The computer implemented method of claim 16, further comprising applying an image recognition machine learning model to classify cropped images as belonging to respective pre-defined views.

18. The computer implemented method of claim 11, wherein the respective machine learning models process images with non-overlapping views of the vehicle.

19. The computer implemented method of claim 11, wherein predicting the likelihood of total loss further comprises:

predicting the first likelihood of total loss based on the first set of extracted features;

predicting the second likelihood of total loss based on the second set of extracted features; and predicting the likelihood of total loss based on the first likelihood of total loss and the second likelihood of total loss.

20. The computer implemented method of claim 19, wherein, determining the second likelihood of total loss further comprises fusing together the second set of extracted features.

21. A non-transitory computer-readable medium containing computer program code for processing a plurality of digital images, the computer program code being executable by a processor for the processor to perform a method, the method comprising:

determining a location of a vehicle and defining a bounding box surrounding the location based on applying an object detection machine learning model to distinct images of the vehicle;

cropping the distinct images to display only the vehicle and rotating the distinct images to a defined orientation;

generating a tiled image of the vehicle by combining the distinct images into a single image of different angle views in equal portions of the tiled image;

processing the generated tiled image via a first convolutional neural network configured for image processing and trained based on historical tiled image data to extract a first set of image features from tiled images to predict a first likelihood of total loss for the vehicle; and processing via a second set of distinct and separate convolutional neural networks a multi-fusion set of images comprising the set of distinct images, each of the second set of convolutional neural networks trained for a different non-overlapping view of the vehicle, using historical multi-fusion images, to extract a second set of image features from multi-fusion images to predict a second likelihood of total loss for the vehicle.

* * * * *